US008261971B2

(12) United States Patent
Hung et al.

(10) Patent No.: US 8,261,971 B2
(45) Date of Patent: Sep. 11, 2012

(54) SELF-POWERED ELECTRONIC LABEL

(75) Inventors: Wai Hung, Hong Kong (HK); Ming Lu, Sijhih (TW)

(73) Assignees: Hong Kong Applied Science and Technology Research, Hong Kong Science Park; Institute Company Limited, Shatin, New Territories, Hong Kong (CN)

( * ) Notice: Subject to any disclaimer, the term of this patent is extended or adjusted under 35 U.S.C. 154(b) by 226 days.

(21) Appl. No.: 12/826,669

(22) Filed: Jun. 30, 2010

(65) Prior Publication Data

US 2012/0000974 A1   Jan. 5, 2012

(51) Int. Cl.
*G06F 17/00* (2006.01)
(52) U.S. Cl. ........................ 235/375; 235/385
(58) Field of Classification Search ............ 235/375, 235/385, 383, 439, 491; 345/32, 1.1
See application file for complete search history.

(56) References Cited

U.S. PATENT DOCUMENTS

| | | | |
|---|---|---|---|
| 5,635,915 A | 6/1997 | Gray | |
| 5,753,900 A | 5/1998 | Goodwin, III et al. | |
| 5,929,778 A | 7/1999 | Asama et al. | |
| 5,963,133 A | 10/1999 | Monjo | |
| 6,307,919 B1 | 10/2001 | Yoked | |
| 6,715,676 B1 | 4/2004 | Janning et al. | |
| 7,152,040 B1 | 12/2006 | Hawthorne et al. | |
| 7,551,149 B2* | 6/2009 | Rosander et al. | 345/2.3 |
| 7,583,901 B2 | 9/2009 | Nakagawa et al. | |
| 2003/0132924 A1 | 7/2003 | Hamilton | |
| 2004/0164950 A1* | 8/2004 | Cabrera | 345/107 |
| 2006/0095647 A1* | 5/2006 | Battaglia et al. | 711/100 |
| 2006/0273162 A1* | 12/2006 | Andersson et al. | 235/383 |
| 2008/0164310 A1* | 7/2008 | Dupuy et al. | 235/385 |
| 2008/0198098 A1* | 8/2008 | Gelbman et al. | 345/59 |
| 2009/0273443 A1* | 11/2009 | Nilsson et al. | 340/5.91 |
| 2009/0284459 A1* | 11/2009 | Wallener et al. | 345/102 |

FOREIGN PATENT DOCUMENTS

| | | |
|---|---|---|
| CN | 101441706 A | 5/2009 |
| EP | 0844578 | 5/1998 |
| JP | 07-008684 | 2/1995 |

OTHER PUBLICATIONS

State Intellectual Property Office of the People's Republic of China, Search Report for Hong Kong Short-term Patent Application, Jul. 29, 2010, China.

* cited by examiner

*Primary Examiner* — Edwyn Labaze
(74) *Attorney, Agent, or Firm* — Ella Cheong Hong Kong; Margaret A. Burke; Sam T. Yip (57) ABSTRACT

An electronic label system is provided which includes a data source having information to be displayed by an electronic label. An optical source such as an LED array broadcasts optical signals modulated with the data source data to plural electronic labels. Each electronic label has an optical receiver which receives the modulated optical signals and also receives unmodulated optical signals to supply power to an energy storage device. A mode switch switches the optical receiver between a signal reception mode and an energy storage device power-supplying mode. One or more bistable displays display the data received from the modulated optical signals. Through the use of bistable displays, the power consumption of the electronic label is greatly reduced while use of a single receiving element for receiving both the signal light and power storage light reduces the number of components needed to assemble the electronic label, thus reducing cost.

18 Claims, 7 Drawing Sheets

SELF-POWERED ELECTRONIC LABEL

FIELD OF THE INVENTION

The present invention relates to electronic labels that display information and, more particularly, to low-power consumption electronic labels that are powered by ambient light and are remotely-controllable.

BACKGROUND

In warehouses, retail establishments, shipping centers and other places where products are stored, it is convenient to affix electronic labels on or adjacent to products to identify the product and include other important information such as price, product destination, country of origin, etc. Because the information displayed on electronic labels often needs to be changed or updated, it is particularly useful to be able to remotely control the information displayed on the electronic label.

Various electronic label systems have been proposed. For example, U.S. Pat. No. 6,715,676 describes an electronic price label in which an infrared LED array is used to transmit information to a receiver on the label. This receiver is an IR-filtered photodiode. A separate solar cell is used to charge a battery to power a label display.

U.S. Pat. No. 5,635,915 describes a product pricing system for a supermarket in which electronic shelf labels are provided with pricing information by modulating fluorescent lamps in the store. The information is received by a photodiode. A liquid crystal display is powered by a battery charged by a solar cell.

Liquid crystal displays in prior electronic labels use considerable energy to maintain the visible indication of information, resulting in the need for frequent battery replacement. Further problems with prior art electronic labels relate to complexity of delivery of information such as the need for RF or IR transmitters; some prior art labels also require considerable power consumption to send out response messages to a control system. Additionally, prior art labels typically use separate devices to receive signals and to charge batteries, resulting in additional complexity and expense.

Thus there is a need in the art for remotely-controllable electronic labels that are low in power consumption, simple in design, and use a low power and easy-to-modulate source of signals.

SUMMARY OF THE INVENTION

The present invention solves the problems of prior art electronic label systems by providing a system which includes a data source which includes information to be displayed by an electronic label. An LED array is used for broadcasting optical signals to a plurality of the electronic labels. A modulator modulates the optical signals broadcast by the LED array with data from the data source. Each electronic label has an optical receiver which receives the modulated optical signals broadcast by the LED array and also receives unmodulated optical signals to supply power to an energy storage device. The energy storage device can be a rechargeable battery or a capacitive device. A mode switch switches the optical receiver between a receiver mode and an energy storage device power-supplying mode. One or more bistable displays display the data received from the modulated optical signals. Through the use of a bistable display, the power consumption of the electronic label is greatly reduced since power is used only to change the state of the display, rather than to maintain the display state as with liquid crystal displays. This reduction in power translates into longer label life and thus a lower cost of ownership of the inventive system.

Use of a single receiving element for receiving both the signal light and ambient light for charging the energy storage device reduces the number of components needed to assemble the electronic label, thus reducing cost.

Through the use of a bistable display, information such as power status and signal strength status can be easily indicated.

BRIEF DESCRIPTION OF THE DRAWINGS

FIG. 1A is a schematic overview of an electronic label system according to one embodiment of the present invention while

DETAILED DESCRIPTION

Figure 1A:
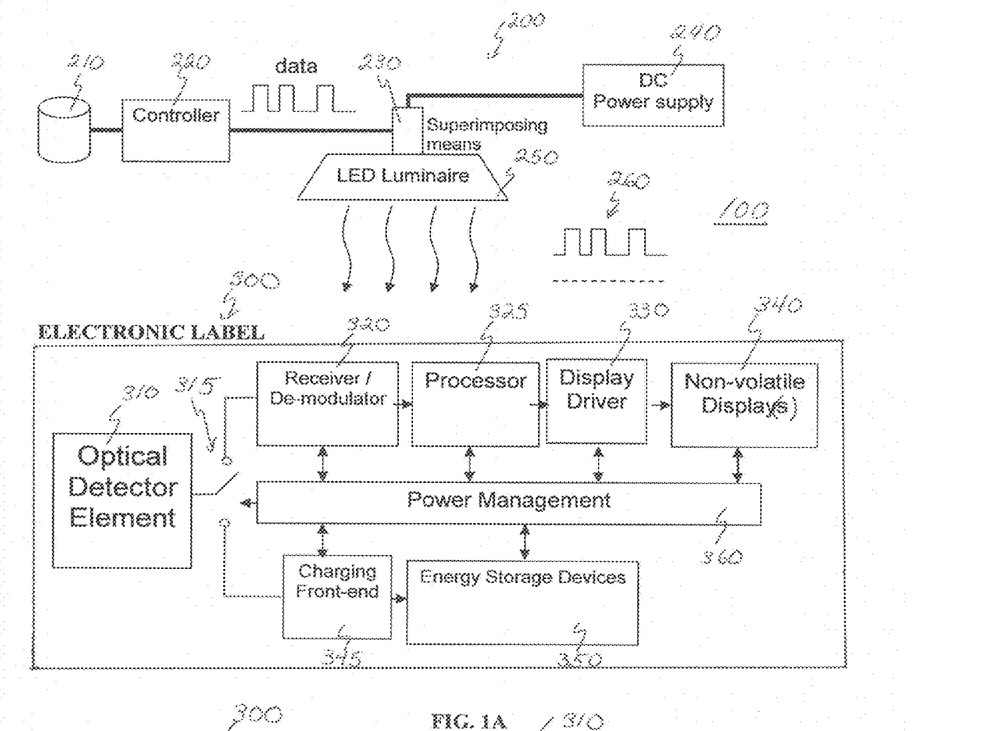

Turning now to the drawings in detail, FIG. 1A schematically depicts an overview of an electronic label system 100 according to the present invention. System 100 includes optical signal source 200 and electronic label 300 for receiving the optical signals from source 200. Optical signal source 200 includes data source 210 and controller 220 for creating a modulated data signal to be sent to superimposing element 230. In connection with DC power supply 240, superimposing element 230 creates a modulated power supply signal to power a light source 250. In one embodiment, light source 250 is an LED array, such that an intensity-modulated optical signal 260 is created. A variety of known intensity-modulation techniques may be used to modulate the optical signal including, but not limited to, binary OOK, multi-level PAM, PWM, and PSK. The wavelength(s) of the optical signals emitted by LED array are preferably selected to be within the range of approximately 450 nm to 900 nm although it is understood that other wavelengths or wavelength ranges may be used.

LED array 250 is typically an LED luminaire with plural LEDs. These LEDs may be the same or different colors, for example, a set of red, green, and blue LEDs, a set of blue and yellow LEDs, etc. When the LED array 250 is also used to provide ambient lighting to the space in which the electronic labels are located, such as a retail space or warehouse, then it is preferable that the light produced be white light. As the optical signal 260 is modulated periodically and the duration of the modulated period is relatively short, customers of the retail space or workers in a warehouse are generally unaware of a variation in intensity of the ambient light and perceive the ambient light intensity to be constant.

Electronic label 300 includes an optical detector/optical receiving element 310 for receiving the optical signal 260. Element 310 is typically a photovoltaic device that is capable of converting optical signals to electrical signals. Photovoltaic cells and photodiodes are examples of photovoltaic devices used as the optical receiving element. Because optical receiving element 310 is used to receive both the modulated optical signal 260 as well as unmodulated light emitted by the light source and any additional ambient light to power the electronic label, a switch, logically indicated by element 315 is included to switch the electrical signal emitted by element 310 between a received modulated optical signal path and an energy storage device power-supplying path When the optical signal emitted by light source 250 is a modulated optical signal, the electrical signal emitted by optical detector/receiving element 310 is routed by switch 315 to demodulator 320 to extract data from the signal. This data is sent to processor 325 which controls display driver 330 to display the data on one or more non-volatile displays 340. Optionally a two-stage amplifier (not shown) is positioned on the data-receiving/demodulating path (elements 320, 325, 330, etc) such that it receives the electrical signal generated from the received optical signal. In the first stage of the amplifier, the electrical signal generated from the optical receiving element is amplified. The amplified signal from the first stage is processed by the second stage amplifier stage. The second stage amplifier screens out any signal that cannot meet a threshold criteria. This nonlinear amplifier design can reshape the received signal profile and thereby enhance the data transmission speed.

Non volatile display(s) 340 is preferably one or more bistable display(s), that is, a display in which an electrical signal is used to "write" information which remains in the written state without the need for additional electrical power to maintain the written state of the information. Additional electrical signals "erase" or "rewrite" the information on the label to display new information or to display no information. Such bistable displays consume less power than conventional LCD displays which require a continuing electrical field to maintain the display of information. Examples of bistable displays include, but are not limited to, "electronic paper", ferroelectric or chiral nematic liquid crystals, cholesteric liquid crystals (commercially available from Kent Displays, Varitronix, and LC-TEC) gyricon particles (commercially available from Gyricon Media Corp.), magnetic materials, "electronic ink" (commercially available from E Ink Corporation) electrophoretic, or electrochromic materials (commercially available from NTERA). However, any material that exhibits bistability may be used in the one or more displays 340 in electronic label 300 of the present invention.

When unmodulated light is received by optical detector/receiver 310, the emitted electrical signal is sent by switch 315 to the power-supplying path so that the energy storage device can be replenished. The electrical signal is sent to charging front-end 345 which charges the energy storage device 350. Charging front-end 345 may optionally be a voltage regulator device and a resistor that combine to form a charging circuit. Such devices are widely commercially available, for example, from National Semiconductor.

Energy storage device 350 may be any suitable energy storage device such as a rechargeable battery or a capacitive element such as an ultra-capacitor. However, any device that can store a charge derived from an optical detector/receiver may be used as the energy storage device 350 of the present invention.

The optical switching function can be performed by integrating a digital clock device and a logic gate to form a simple and reliable switching logic circuit. Such a logic circuit would, via timing set by the digital clock, automatically switch between a signal reception mode sensing a flag signal indicated that a modulated transmission is coming or a power supply mode for charging the energy storage device 350. Alternatively, the light source and switch can be synchronized such that the label is switched to modulated optical signal reception mode at the same time that the light source sends out modulated optical signals.

To power the various elements of the electronic label, a power management element 360 is used. Power management element 360 receives electricity from the energy storage device and supplies demodulator 320, processor 325, display driver 330 and display(s) 340. The power management element 360 can use the processor 325 in making the logic circuit for switch 315. When there is an indication that a modulated optical signal will be sent, e.g., a "flag" which is received by the optical receiving element the processor 325 can signal the switching logic circuit to interrupt the automatic switch mode process and switch to the data receiving mode.

Figure 1B:
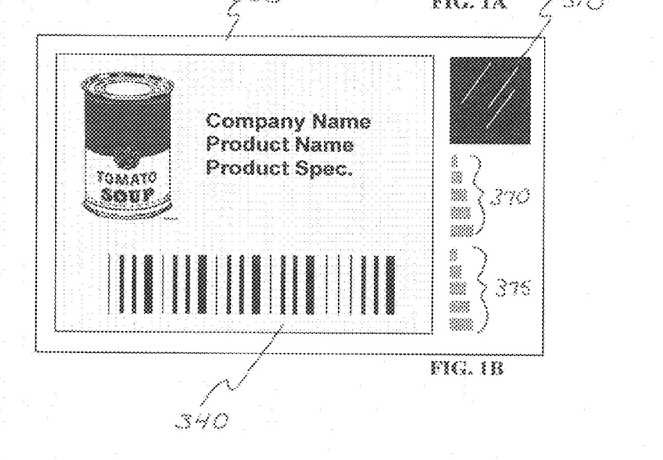
FIG. 1B is an example of a front-surface view of an electronic label.

FIG. 1B depicts an exemplary front view of electronic label 300. Display 340 can display various product information such as the name of the company that made the product, an image of the product, price, product specifications, and/or a bar code. The label may optionally display a signal strength indicator, 370, which shows the strength of the most recently-received optical signal. The power status of the energy storage device 375 may also be optionally displayed, the power status being updated at the time of the most recent label update. The label may be affixed to the product itself or to a support on which the product is placed, such as a shelf in a retail store or a warehouse.

Figure 2:
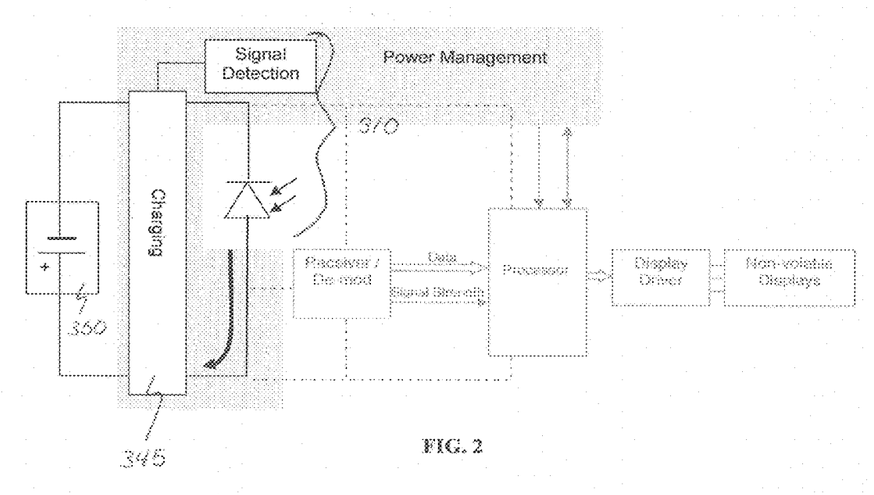
FIG. 2 is a schematic overview of the electronic label system of FIG. 1 in an energy storage device power supplying mode.

FIG. 2 schematically depicts the operation of the electronic label in the "charging" mode, that is, when a modulated optical signal is not being received. The optical signal is converted to an electrical signal which is routed to charge the energy storage device.

Figure 3:
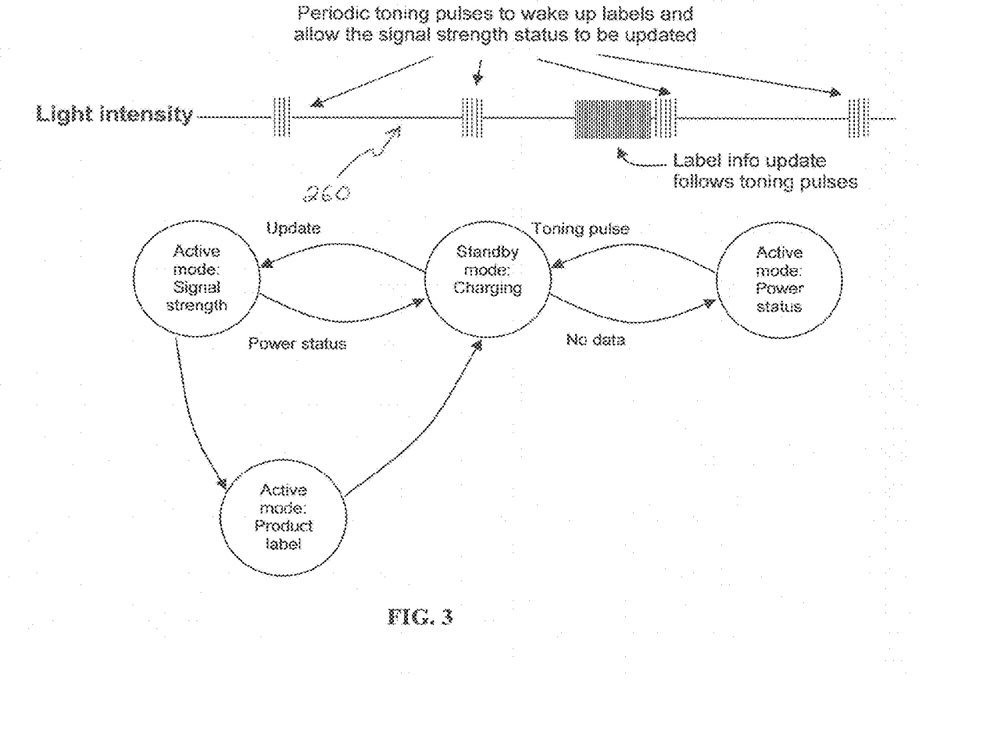
FIG. 3 depicts a flow chart of processes for switching a label between receiver mode and power supplying mode.

FIG. 3 depicts a process by which the electronic label is notified that a modulated optical signal will soon be broadcast such that the label switched to a signal-receiving mode. Periodically, toning pulses are sent by LED array 250. These toning pulses do not contain information to be displayed by the label but can optionally be used to update the signal strength status indicated on the label. A modulated signal containing label update information follows one of the toning pulses. Since the toning pulses indicate that the optical switch 315 should send the electrical signals from the optical detector 310 to the signal-receiving mode path, the label is set to receive the modulated signal that contains information to be displayed by the label.

Figure 4:
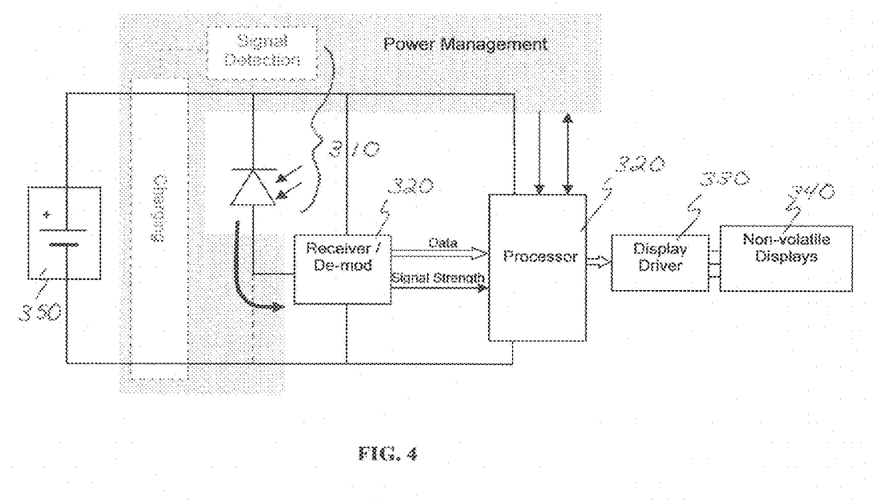
FIG. 4 is a schematic overview of the electronic label system of FIG. 1 in a modulated optical signal receiving mode.

FIG. 4 schematically depicts the signal path taken from optical detector 310 after reception of a modulated optical signal. The data to be displayed as well as the signal strength are routed to the processor 325 and displayed on the display(s) 340 via display driver 330.

Figure 5:
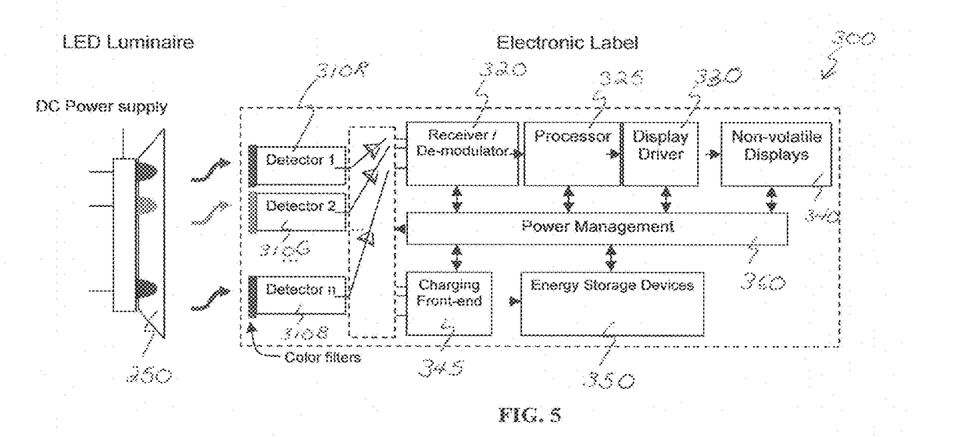
FIG. 5 is a schematic overview of an electronic label system using a wavelength division multiplexed optical source and a label configured to receive multiple wavelengths from the wavelength division multiplexed optical source.

FIG. 5 depicts an electronic label system using wavelength division multiplexing to send plural modulated optical signals to an electronic label 300. In this embodiment, the LED array 250 includes multiple color LEDs. Each of these LEDs is modulated with different data and the optical signals are sent out to the optical detector 310. Each LED can send out its signal simultaneously with the other LEDs or sequentially. In the case of sequential transmission, each LED is flashed intermittently such that the resultant light appears white to human observers.

The optical detector 310 may be subdivided by optical filters corresponding to the different colors of the LEDs. As see in FIG. 5, the optical detector has portion 310R with a red filter, a portion 310G with a green filter, and a portion 310B with a blue filter. These filters may cover the entire surface of optical detector 310 or the filtered regions may form separate optical detectors while, optionally, portions of the detector 310 without filters may be dedicated to power supply mode for the energy storage device 350.

Figure 6:
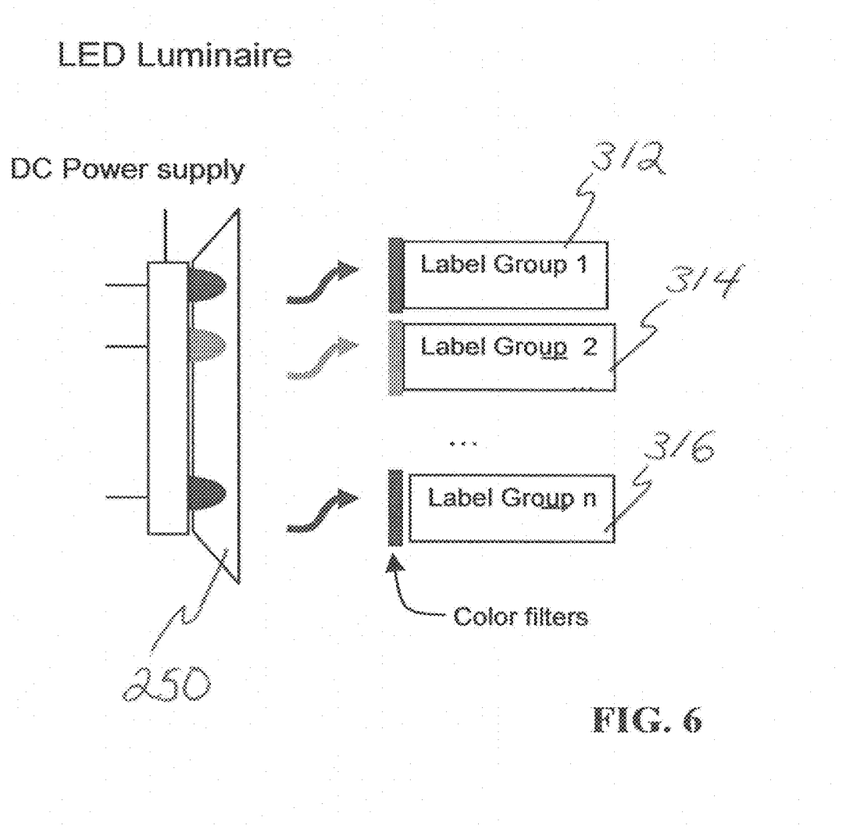
FIG. 6 is an overview of an electronic label system using a wavelength division multiplexed optical source and a label configured to receive a single wavelength from the wavelength division multiplexed optical source.

In another embodiment using wavelength division multiplexing, various groups of labels can be configured to receive a particular wavelength of light from the WDM optical signal. For example, a group of labels 312 are provided with a red filter and only read the modulated signal emitted by the red LED, while label group 314 is provided with a green filter and label group 316 is provided a blue filter. In this way, the bandwidth of the system can be efficiently utilized since different groups of labels are targeted by each color LED in the LED array.

Figure 7:
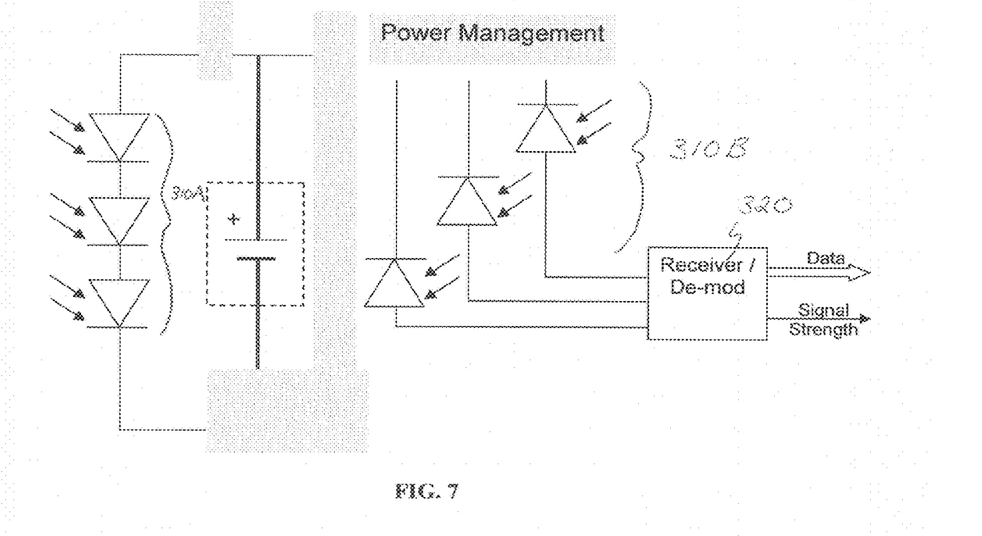
FIG. 7 depicts an electronic label system in which the optical receiver comprises a multi-segment photodiode in which plural segments are dedicated to power-supply to the energy storage device and plural segments are switched between a modulated optical signal receiving mode and an energy storage device power-supplying mode.

In FIG. 7, a multi-segmented photodiode is used as the optical detector element 310. Segments 310A are dedicated to power supply for the energy storage device while segments 310B are dedicated to reception of a modulated optical signal. In the case of a WDM signal as discussed above, one or more of the segments 310B can be provided with a bandpass filter to ensure that only light of a certain wavelength is selected by that photodiode segment.

While the foregoing invention has been described with respect to various embodiments, such embodiments are not limiting. Numerous variations and modifications would be understood by those of ordinary skill in the art. Such variations and modifications are considered to be included within the scope of the following claims.

What is claimed is:

1. An electronic label system comprising:
a data source including information to be displayed by an electronic label;
an LED array for broadcasting optical signals to a plurality of the electronic labels;
a modulator for modulating the optical signals broadcast by the LED array with data from the data source;
the electronic label comprising an optical receiver for receiving the modulated optical signals broadcast by the LED array and for receiving unmodulated optical signals for supplying power to an energy storage device, a mode switch for switching the optical receiver between a modulated optical signal receiving mode and an energy storage device power-supplying mode, and one or more bistable displays for displaying the data received from the modulated optical signals, the bistable display continuously displaying a set of data without the need for a display-maintaining electric field until receipt of a new modulated optical signal causes new data to be displayed.

2. An electronic label system according to claim 1 wherein the LED array comprises a plurality of LEDs of different colors including at least red, green and blue LEDs, and further comprising a controller for controlling the LEDs to generate a wavelength division multiplexed optical signal.

3. An electronic label system according to claim 2 wherein the optical receiver includes an optical filter covering at least a portion of a surface of the optical receiver, the filter being configured to receive light of a single wavelength from the wavelength division multiplexed optical signal.

4. An electronic label system according to claim 2 wherein the optical receiver includes plural optical filters covering at least a portion of a surface of the optical receiver, each of the plural filters being configured to receive light of a single wavelength from the wavelength division multiplexed optical signal.

5. An electronic label system according to claim 2 including a plurality of electronic labels, a subset of the plurality of electronic labels each including an optical filter covering at least a portion of the optical receiver such that a given subset of electronic labels is configured to receive only one wavelength of light from the wavelength division multiplexed optical signal.

6. A method for sending a modulated WDM optical signal to a plurality of electronic labels using the electronic label system of claim 2 comprising sequentially flashing the red, green, and blue LEDs sequentially for periods of time such that the human eye perceives emitted light as being white light.

7. A method for sending a modulated WDM optical signal to a plurality of electronic labels using the electronic label system of claim 2 comprising sequentially flashing the red, green, and blue LEDs simultaneously for periods of time such that the human eye perceives emitted light as being white light.

8. An electronic label system according to claim 1, wherein the optical receiver comprises a multi-segment photovoltaic device in which plural segments are dedicated to power-supply to the energy storage device and plural segments are switched between a modulated optical signal receiving mode and an energy storage device power-supplying mode.

9. An electronic label system according to claim 1 wherein the wavelength of the optical signal is one or more wavelengths in a range from 450 nm to 900 nm.

10. An electronic label system according to claim 1 wherein the bistable display is selected from electronic paper, ferroelectric liquid crystal displays, chiral nematic liquid crystal displays, cholesteric liquid crystal displays, gyricon particle displays, magnetic material-based displays, electronic ink displays, electrophoretic displays, or electrochromic displays.

11. An electronic label system according to claim 1 wherein the LEDs are selected from an array of LEDs.

12. An electronic label system according to claim 1 wherein the optical receiver is a photovoltaic device.

13. An electronic label system according to claim 1 further comprising a demodulator and a processor.

14. An electronic label system according to claim 13 further comprising a bistable display driver.

15. An electronic label system according to claim 1 further comprising a power management device communicating with the energy storage device and the bistable display.

16. An electronic label system according to claim 1 wherein the optical receiver comprises a multi-segment photovoltaic device in which plural segments are dedicated to power-supply to the energy storage device and plural segments are dedicated to a modulated optical signal receiving mode.

17. A method for updating information on an electronic label using the electronic label system of claim 1 comprising emitting a modulated optical signal from the LED array, receiving the modulated optical signal and updating information displayed on a bistable display and maintaining the information displayed on the bistable display until another modulated optical signal is received from the LED array containing new information to be displayed.

18. An electronic label system comprising:
a data source including information to be displayed by an electronic label;
an LED array for broadcasting optical signals to a plurality of the electronic labels;
a modulator for modulating the optical signals broadcast by the LED array with data from the data source;
the electronic label comprising an optical receiver for receiving the modulated optical signals broadcast by the LED array and for receiving unmodulated optical signals for supplying power to an energy storage device, a mode switch for switching the optical receiver between a modulated optical signal receiving mode and an energy storage device power-supplying mode, and one or more bistable displays for displaying the data received from the modulated optical signals, the bistable display continuously displaying a set of data without the need for a display-maintaining electric field until receipt of a new modulated optical signal causes new data to be displayed;
wherein the optical receiver comprises a multi-segment photovoltaic device in which plural segments are dedicated to power-supply to the energy storage device and plural segments are switched between a modulated optical signal receiving mode and an energy storage device power-supplying mode.

* * * * *